United States Patent

Chambers, Jr.

[15] 3,706,862

[45] Dec. 19, 1972

[54] AMPLIFIER CIRCUIT FOR TRANSMISSION LINES

[72] Inventor: Charles W. Chambers, Jr., Amherst, Ohio

[73] Assignee: Lorain Products Corporation

[22] Filed: June 28, 1971

[21] Appl. No.: 157,471

[52] U.S. Cl. ...........179/170 T, 179/16 F, 179/170 R

[51] Int. Cl. ...............................................H04b 3/36

[58] Field of Search .............179/170 R, 170 T, 16 F; 333/17; 325/172, 173, 174

[56] References Cited

UNITED STATES PATENTS

| | | | |
|---|---|---|---|
| 3,509,500 | 4/1970 | McNair | 333/17 |
| 3,573,402 | 4/1971 | Chambers | 179/170 R |
| 3,045,074 | 7/1962 | Mindermann | 179/170 R |

*Primary Examiner*—Kathleen H. Claffy
*Assistant Examiner*—David L. Stewart
*Attorney*—John Howard Smith

[57] ABSTRACT

A circuit for increasing the amplitude of signals transmitted through a bi-directional voice transmission line. A series amplifying network energized in accordance with the voltage across the line produces a signal voltage in aiding relationship to a transmitted signal. A shunt amplifying network energized in accordance with the current through the line produces a signal current in aiding relationship to that transmitted signal. A switching circuit controls the phase relationship between the input and output quantities of each amplifying network in accordance with the direction of transmission of the signal of highest amplitude at any given time, to amplify signals transmitted in that dominant direction and to suppress echo signals transmitted in the other or non-dominant direction. Circuitry is provided to vary the amplitudes of the input signals to the series and shunt amplifying networks as a function of the impedance of the line to provide stable amplification and fidelity of reproduced signal over a wide range of frequencies and transmission line impedances.

24 Claims, 3 Drawing Figures

INVENTOR:
CHARLES W. CHAMBERS JR
BY
John Howard Baird
ATTORNEY

INVENTOR:
CHARLES W. CHAMBERS JR
BY
ATTORNEY

AMPLIFIER CIRCUIT FOR TRANSMISSION LINES

BACKGROUND OF THE INVENTION

The present invention relates to amplifier circuits and is directed more particularly to amplifier circuits for increasing the amplitude of voice signals transmitted through a transmission line.

In communication systems wherein voice signals are transmitted over substantial distances by metallic conductors, it is necessary to provide circuitry which can compensate for the attenuation of the signal in the transmission line. In telephone systems, for example, it is necessary to provide repeaters to maintain satisfactory signal transmission through telephone lines which, in the absence of such repeaters, would excessively attenuate signals transmitted therethrough. Prior to the present invention, repeater circuits suitable for utilization with two-wire, two way transmission lines have been of three major types, namely: negative impedance repeaters, hybrid repeaters and voice-switched amplifiers. All of these types of circuits present serious problems.

Hybrid repeaters require balancing networks which must be carefully adjusted initially to establish line balance. Thereafter, this balance must be maintained. Consquently, further delicate adjustments are often necessary to maintain satisfactory operation in the presence of changes in the physical or electrical characteristics of the line or the balancing network.

Negative impedance repeaters become unstable as a function of the impedance of the transmission line with which they are utilized. A series negative impedance repeater, for example, will become unstable and oscillate when the transmission line with which it operates presents an impedance that is too low. A shunt negative impedance repeater, on the other hand, will become un-stable and oscillate when the transmission line with which it operates presents an impedance that is too high. To reduce the effect of this instability, negative impedance repeaters must be carefully adjusted to take into account the type of cable used in the line, the type of loading and the location along the length of the line. This is expensive and time consuming.

Another problem with negative impedance repeaters is that they amplify reflected signals, that is, signals which travel back to the transmitter after traversing the line in the intended direction of their transmission. Such reflected signals not only make the transmission of a verbal message difficult but can also cause the repeater to oscillate. This problem occurs because negative impedance repeaters cannot distinguish between the two directions of transmission therethrough and therefore amplify the reflected signal in the same manner as the transmitted signal. This is manifested by a low return loss and resultant insufficient attenuation of echo. To reduce reflection problems it is often necessary to provide separate echo suppressor circuits which attenuate the weaker or reflected signal at additional expense.

Still another problem with negative impedance repeaters is that the introduction thereof into a transmission line degrades the existing impedance matching of connected portions of the transmission system. The resulting mismatching gives rise to reflections from the repeater as well as from the ends of the transmission line. To reduce the effect of this problem it is necessary to connect negative impedance repeaters to the line through line-build-out networks which match the impedance of the line to the repeater over the range of frequencies to be transmitted. These line-build-out networks must be carefully adjusted to take into account the type of cable used in the line, the type of loading and the location in the line. This also is expensive and time consuming.

The problem presented by voice-switched amplifiers, that is, amplifiers which transmit signals in only one direction at a time and which change the direction of transmission only when one party begins to talk after the previously talking party stops talking, was that when the then listening party tried to talk, to respond or even to interrupt, as in a normal conversation, he could not be heard by the then talking party. His response was heard by the other party only when that party chose to stop talking, thus giving the former listening party the line and the capability of being heard. This imparted a discernible switched quality to conversation. There is here presented, on the other hand, switching and amplifying circuitry which switches and amplifiers each end of the line, not on a clause, sentence or statement basis but rather on a syllabic basis. Consequently, the amplifier changes states, as required, to follow relatively minute or short-lived changes in the volume of the normal syllabic speech of both parties and thereby permits the conversation to be transmitted with the effect of a normal face-to-face conversation. Normal, interruptive response by the listener during the statement of the then talker will be heard by the latter with the circuitry of the invention without the parties being aware that switching activity is taking place.

In addition, the requirement that voice-switched amplifiers shall not change directional states of amplification in response to pauses between syllables, required a delay between the termination of speech by the talking party and the commencement of transmission by the listening party. This delay often resulted in the "-clipping" of the first sounds made by a party after beginning transmission. Finally, because the ability of either party to seize control of the amplifier depended only upon which party was first to produce a signal of sufficient amplitude, high amplitude signal noise on the line could prevent the transmitting party from giving up control of the amplifier, thus preventing the transmitting party from receiving incoming signals.

With the present invention, there is provided an amplifier circuit which is devoid of the complex adjustment problems presented by negative impedance repeaters and which does not present the transmission and communication difficulties presented by voice-switched amplifiers.

For the purpose of this description of the present invention the term "dominant" is here used to identify the one party, in a two-party telephone conversation, who, at any given instant is transmitting a signal of a greater amplitude than that of the other party whether the greater amplitude arises because of silence of the other party or because of the simultaneous transmission by the other party of a signal of lower amplitude. The term "non-dominant" is used herein to identify the party either transmitting this lesser amplitude signal or who is silent at any given instant.

SUMMARY OF THE INVENTION

It is an object of the invention to provide an improved amplifier for increasing the amplitude of signals transmitted through multi-wire transmission lines.

Another object of the invention is to provide an amplifier circuit which provides substantially constant gain over a wide range of signal frequencies.

Still another object of the invention is to provide an amplifier circuit which automatically stabilizes the impedance matching between itself and the transmission line looking toward the transmitting party in the presence of variations in the impedance of the transmission line looking toward the receiving party.

It is another object of the invention to provide an amplifier circuit that is stable for all values of impedance which may be connected thereto.

A further object of the invention is to provide an amplifier circuit having a first directional amplifying state wherein a signal originating at a first end of the line is amplified and a signal originating at a second end of the line is attenuated, a second directional amplifying state wherein a signal originating at the second end of the line is amplified and a signal originating at the first end of the line is attenuated and a third, non-directional or quiescent state wherein signals originating at neither end of the line are amplified.

It is an object of the invention to provide an amplifier circuit of the above character which switches between its first and second directional amplifying states in accordance with changes in the relative amplitudes of the signals transmitted from opposite ends of the transmission line, that is, in accordance with changes in the dominant direction of transmission through the transmission line. The circuit of the invention provides amplification in the transmission from the dominant to the non-dominant party, sufficient to provide the desired level of signal transmission but not great enough to cause oscillation and provides attenuation or return loss in the transmission from the non-dominant to the dominant party, sufficient to suppress echo and yet not sufficient to distort voice signals during a conversation.

It is yet another object of the invention to provide an amplifier circuit of the above character which switches between its directional amplifying states so rapidly and quietly that the switching activity of the amplifier is substantially undetectable by either party, the circuit of the invention being, in effect, a syllabic switching amplifier.

Yet another object of the invention is to provide an amplifier circuit including both series and a shunt connected amplifying networks. Stillanother still another object of the invention is to provide an amplifier circuit wherein the series amplifying network is energized in accordance with the voltage which the transmitting party or instrumentality establishes across the transmission line and wherein the shunt amplifying network is energized in accordance with the signal current which the transmitting party or instrumentality establishes in the transmission line thereby preventing oscillations which can disrupt normal telephone conversation over the system.

It is a further object of the invention to provide an amplifier circuit wherein the amplitude of the input signals of the series and shunt amplifying networks varies in accordance with the impedance of the transmission line.

A further object of the invention is to provide an amplifier circuit in which the transition between the directional states of amplification comprises changing the phase relationships between the input and output voltages of the series and shunt amplifying networks.

Another object of the invention is to provide an amplifier circuit of the above character wherein the determination of the dominant direction of transmission in the transmission line is made on the basis of the phase relationships between the induced voltages appearing on the series and shunt portions of the amplifier circuit.

It is yet another object of the invention to provide a voice amplifier for telephony systems which is capable of providing orderly amplification during a two-way conversation and is sufficiently rapid in its switching activity to accommodate the change of higher amplitude signals from one party to another as occurs in normal syllabic conversation, without this switching activity being discernible to the parties conversing and imparting overall amplification severally to both ends of the conversation as is required in normal, human voice conversation.

Generally speaking, the amplifier circuit of the invention comprises a series amplifying network which is energized in accordance with the voltage across the transmission line, a shunt amplifying network which is energized in accordance with the current in the transmission line and a switching circuit for controlling the phase relationships between the input and output voltages of each amplifying network in accordance with the dominant direction of transmission in the transmission line. This provides amplification of signals transmitted in the dominant direction and attenuation of signals transmitted in the non-dominant direction. This imparts a natural quality to conversation over the line and at the same time, by attenuating reflections and echo, improves the ability of the circuitry to remain stable. Additionally, the circuit of the invention allows a conversation in the nature of face to face conversation in the presence of the switching, amplifying and echo attenuating activity described herein.

In addition, circuitry is provided to distribute the burden of signal amplification between the series and shunt amplifying networks in accordance with the impedance of the transmission line thereby to provide stable amplification over a wide range of frequencies and transmission line impedances. This results in a substantially "teeter-totter" type operating characteristic wherein the amplitude of the output voltage of the series amplifying network increases or decreases while the amplitude of the output current of the shunt amplifying network decreases or increases respectively as the circuitry adjusts itself to the transmission line with which it operates. This eliminates the need for line-build-out networks and the associated delicate adjustments.

According to the principles of the present invention the signal from the dominant station is amplified while, as is desirable in telephone communication systems, the signal reflected from the non-dominant station is subjected to return loss. This return loss is of a magnitude sufficient to suppress echoes yet the loss from the non-dominant station is not so great as to be detrimental to a voice or other signal from the, at that time, non-dominant station.

DESCRIPTION OF THE INVENTION

Figure 3:
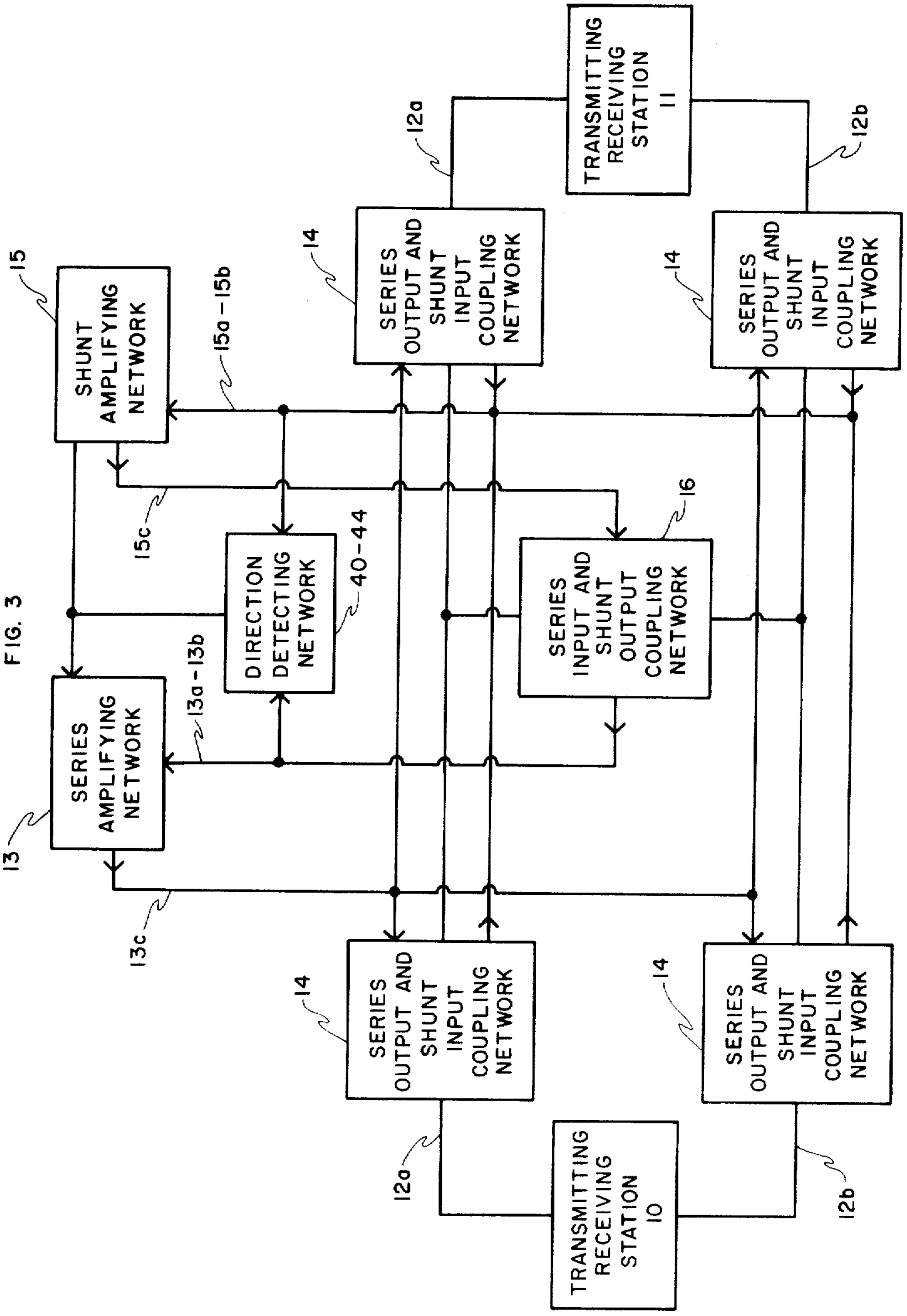
FIG. 3 is a block diagram of the circuit of the invention.

Referring to FIG. 3, there is shown a transmitting-receiving station 10 for transmitting signals to and receiving signals from a transmitting-receiving station 11 through the conductors 12*a* and 12*b* of a two-wire transmission line. Stations 10 and 11 may, for example, comprise telephone sets which are connected through the conductors of a two-wire telephone line.

Generally speaking, the circuit of the invention includes a series amplifying network 13 for generating a first amplifying signal in accordance with the voltage across the line, and a shunt amplifying network 15 for generating a second amplifying signal in accordance with the current through the line. The input 13*a*–13*b* of series amplifying network 13 is energized by a series input coupling network 16 which is connected across the line and the output 13*c* of network 13 is connected in aiding relationship of the transmission line current through balanced series output coupling networks 14. Similarly, the input 15*a*–15*b* of shunt network 15 is energized by shunt input coupling networks 14 which are connected in series with the line and the output 15*c* of network 15 is connected across the line, and in aiding relationship to the current therethrough, through shunt output coupling network 16. This series-shunt cross coupling provides improved stability under all operating conditions of the transmission line.

Each amplifying network exhibits a first operative state suitable for the amplification of signals transmitted from station 10 to station 11 and a second operative state suitable for the amplification of signals transmitted from station 11 to station 10. These operative states are selected by a direction detecting network 40–44 which compares the phase relationships between networks 14 and 16 to determine the dominant direction of transmission through the line. This directional detection and control allows the circuit of the invention to provide amplification to signals transmitted in the dominant direction of transmission and to transmit but attenuate signals in the non-dominant direction of transmission, thus assuring good return loss characteristics for the line.

THE AMPLIFYING CIRCUITRY

Figure 1:
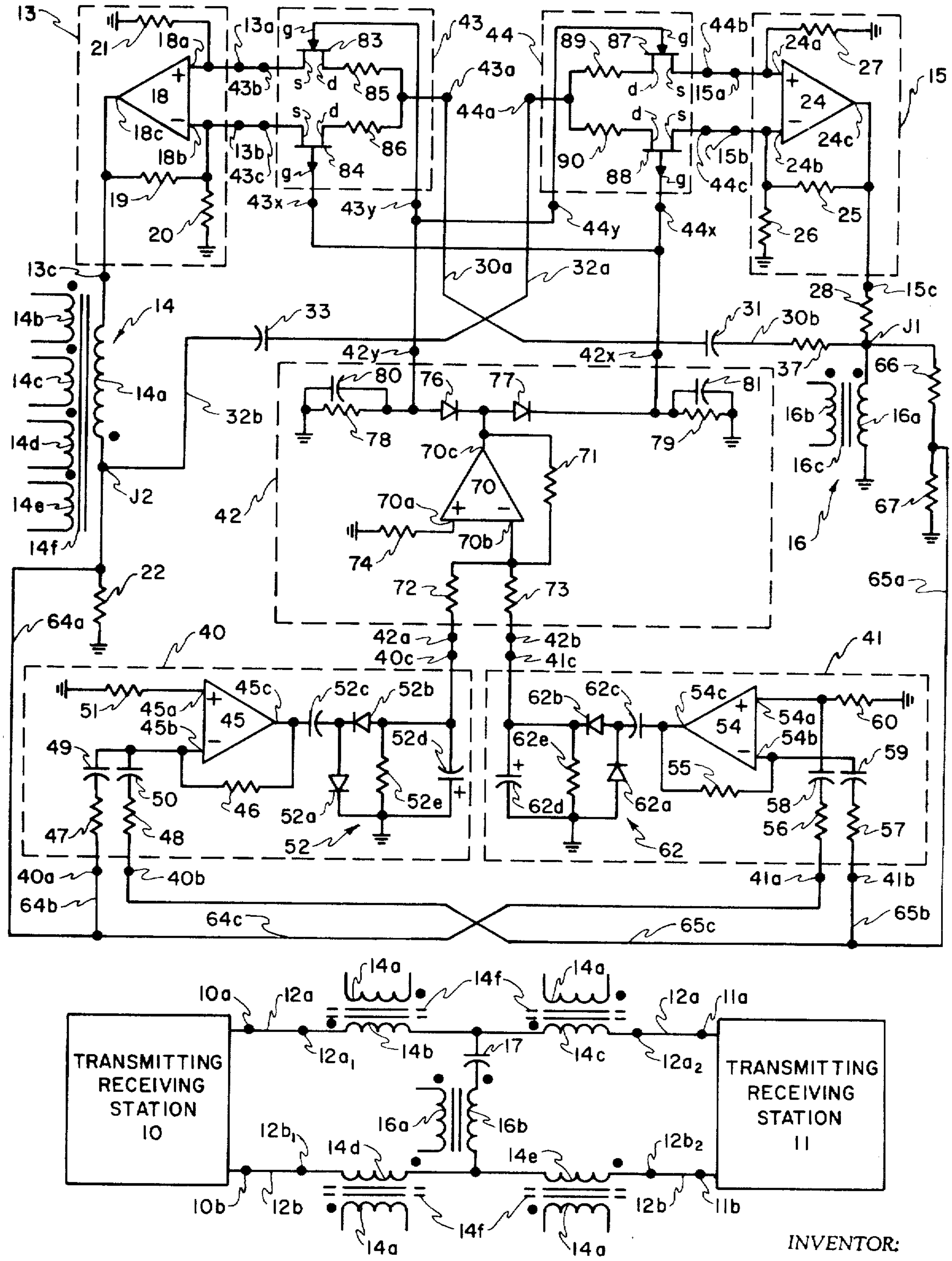
FIG. 1 is a schematic diagram of an exemplary circuit embodying the invention.

As shown in the embodiment of FIG. 1, the circuit of the invention includes series amplifying means which here takes the form of a series amplifying network 13 having input terminals 13*a* and 13*b* and an output terminal 13*c*. This network serves to produce a signal voltage which is in aiding relationship to the signal transmitted by the then dominant party. Series amplifying network 13 is coupled to conductors 12*a* and 12*b* through series coupling means which here takes the form of a transformer 14 having windings 14*a*, 14*b*, 14*c*, 14*d* and 14*e* which are located on a common core 14*f*.

The circuit of the invention also includes shunt amplifying means which includes a shunt amplifying network 15 having input terminals 15 and 15*b* and an output terminal 15*c*. This network serves to produce a signal current which is in aiding relationship to the signal transmitted by the then dominant party. Shunt amplifying network 15 is coupled to conductors 12*a* and 12*b* through shunt coupling means which includes a transformer 16, having windings 16*a* and 16*b* on a common core 16*c*, and through a d-c blocking capacitor 17. It is desirable for this capacitor to have a capacitive reactance which is sufficiently small that winding 16*b* may accurately sense the signal voltage across the transmission line therethrough but which is sufficiently large to prevent substantial a-c ringing currents from flowing across the line during ringing. The former condition allows substantially unimpeded sensing of the signal voltage and the latter condition minimizes cross-ringing, that is, a condition wherein audible ringing occurs at the telephone sets of parties who are not being called.

As will be seen presently, the circuit of the invention also affords echo suppressing attenuation of signals reflected from the non-dominant station during transmission from the dominant station.

Series amplifying network 13 includes an operational amplifier 18, which may be an integrated circuit, having a phase-maintaining or non-inverting input 18*a*, a phase-reversing or inverting input 18*b* and an output 18*c*. It will be understood that the application of an a-c input voltage to phase-maintaining input 18*a* causes amplifier 18 to produce an amplified a-c output voltage that is in phase with the voltage at input 18*a*, and that the application of an a-c input voltage to phase-reversing input 18b causes amplifier 18 to produce an amplified a-c output voltage that is 180° out of phase with the voltage at input 18*b*. Amplifying network 13 also includes a feedback resistor 19, an input load resistor 20 and a balancing resistor 21. Operational amplifier 18 is connected in energizing relationship to transformer windings 14*b*, 14*c*, 14*d* and 14*e* by connecting transformer winding 14*a* between amplifier output 18*c* and ground through a resistor 22.

Shunt amplifying network 15 includes an operational amplifier 24, which may be an integrated circuit, having a phase-maintaining or non-inverting input 24*a*, a phase-reversing or inverting input 24*b* and an output 24*c*. Shunt amplifying network 15 also includes a feedback resistor 25, an input load resistor 26 and a balancing resistor 27. Operational amplifier 24 is connected in energizing relationship to transformer winding 16*b* by connecting transformer winding 16*a* between ground and amplifier output 24*c* through a resistor 28.

Prior to the present invention, it was the practice to utilize negative impedance converters in place of amplifying networks 13 and 15. These negative impedance converters typically included two pairs of terminals together with circuitry which caused the impedance looking into either pair of terminals to be equal to a negative constant times the impedance connected across the other pair of terminals. This was accomplished by means of circuitry which shifted the phase of the output voltage of the converter 180° with respect to the current therethrough (voltage inversion type) or which shifted the phase of the output current of the converter 180° with respect to the voltage thereacross (current inversion type). As previously described, repeater circuits utilizing converter circuits of this kind were unstable as a function of the impedance looking into the transmission line with which they operated. In addition, these converter circuits aggravated existing problems with reflected signals and impedance mismatch in the transmission line.

To the end that the above difficulties may be avoided and in accordance with the present invention, there is provided circuitry which utilizes both voltage and current inversions to afford signal amplification but which is controlled in accordance with the signal voltages and currents of the transmission line to afford stable amplification in transmission lines having a wide variety of electrical characteristics. In the present embodiment, this is accomplished by connecting inputs 13*a* and 13*b* of series amplifying network 13 through conductors 30*a* and 30*b*, a resistor 37 and a coupling capacitor 31, to shunt transformer 16. This assures that the output voltage of series amplifying network 13 varies in accordance with the signal voltage across the transmission line. Similarly, inputs 15*a* and 15*b* of shunt amplifying network 15 are connected, through conductors 32*a* and 32*b* and a coupling capacitor 33, to series transformer 14. This assures that the output current of shunt amplifying network 15 varies in accordance with the signal current through the transmission line.

The above cross-connections provide each amplifying network with an input signal which allows that network to remain stable for all values of transmission line impedance. In addition, these cross-connections allow the amplitude of the signal voltage produced by series amplifying network 13 to vary in relation to the amplitude of the signal current produced by shunt amplifying network 15 and, vice-versa, to stabilize the matching between the impedance of the amplifier and the impedance of the transmission line looking toward the transmitting party.

Assuming that the party at station 10 is transmitting a signal voltage which renders terminal 10*a* positive from terminal 10*b*, a series switching network 43 to be described presently connects feedback conductor 30*a* to phase-maintaining input 13*a* of series amplifying network 13 and a shunt switching network 44 connects feedback conductor 32*a* to phase-maintaining input 15*a* of shunt amplifying network 15. As the amplitude of the signal voltage increases, the polarity-dotted end of winding 16*b* becomes increasingly positive from the non-polarity-dotted end thereof. As a result, junction $J_1$ becomes more positive from ground. This increases the amplitude of the positive voltage which is applied to amplifying network input 13*a*. As a result, output 18*c* of operational amplifier 18 becomes more positive from ground.

Since the voltage between operational amplifier output 18*c* and ground appears across transformer winding 14*a* and resistor 22, an induced voltage appears across winding 14*a* rendering the non-dotted end thereof positive from the dotted end thereof. This causes an induced voltage to appear across transformer windings 14*b*, 14*c*, 14*d* and 14*e* which renders the non-dotted ends thereof positive from the dotted ends thereof. Because the latter voltages are in series-aiding relationship to the signal voltage appearing between station terminals 10*a* and 10*b*, it will be seen that these voltages additively increase the amplitude of the transmitted signal. In addition, since the voltages which amplifying network 13 establishes across windings 14*b*, 14*c*, 14*d* and 14*e* are opposite in polarity to the voltage which the signal current tends to establish thereacross, it will be seen that amplifying network 13 provides amplification by means of a voltage inversion.

At the same time, the increasing signal voltage increases the signal current flowing into the dotted ends of windings 14*b*, 14*c*, 14*d* and 14*e*. This increases the current flowing out of the dotted end of winding 14a to increase the voltage across resistor 22 and, thereby, the potential difference between ground and junction $J_2$. Since the voltage at junction $J_2$ is applied to shunt amplifying network input 15*a*, the voltage appearing at operational amplifier input 24*a* increases and thereby increases the voltage appearing at output 24*c*. As a result, the current flowing from output 24*c* to ground through resistor 28 and transformer winding 16*a* increases and thereby increases the upward flowing current in winding 16*b*. This increase in the upward flowing current in transformer winding 16*b* increases the signal current flowing in the transmission line to the right of winding 16*b*. Because the latter current is in phase with the signal current flowing to the right of winding 16*b*, it will be seen that the current which amplifying network 15 establishes in winding 16*b* additively increases the amplitude of the transmitted signal. In addition, since the current which network 15 establishes in winding 16*b* is opposite in direction to the current which the signal voltage tends to establish therethrough, it will be seen that network 15 provides amplification by means of a current inversion.

From the foregoing, it will be seen that as the transmitted signal induces a voltage across shunt winding 16*b*, the voltage which amplifying network 13 establishes across series windings 14*b*, 14*c*, 14*d* and 14*e* increases the amplitude of the transmitted signal. Similarly, as the transmitted signal establishes a current through series windings 14*b*, 14*c* , 14*d* and 14*e*, the current which shunt amplifying network 15 establishes in shunt winding 16*b* increases the amplitude of the transmitted signal. Thus, series transformer 14 serves as an input coupling device for amplifying network 15 as well as an output coupling device for amplifying network 13 and shunt transformer 16 serves as an input coupling device for amplifying network 13 as well as output coupling device for amplifying network 15.

THE IMPEDANCE CONTROL CIRCUITRY

In the communications field, connected portions of a transmission system are each designed to have the same nominal, standard impedance. Construction of a transmission system in this manner eliminates impedance mismatching and resultant signal reflections or echoes in the line. Generally, the time and expense involved in applying line build out circuitry is necessary to assure that the repeater circuits are impedance matched to the line. In constructing the circuit of FIG. 1, the input impedance thereof is preset at this nominal, standard value. Thereafter, the circuit of the invention will automatically adjust its signal amplifying activity, as required, without the use of line build out circuitry, to oppose any changes in the input impedance presented to the transmitting party in the presence of changes in the impedance of the transmission line looking toward the receiving party. Thus, the circuit of FIG. 1 has an impedance regulating characteristic.

The manner in which the circuit of the invention automatically stabilizes the matching between its own impedance and the impedance of the transmission line looking toward the transmitting party will now be described. Connected to the output of series amplifying network 13, is a first impedance control means which here takes the form of a voltage divider including winding 14*a* and resistor 22. This voltage divider establishes, at junction $J_2$, a voltage which is equal to: $V_{13c} \times [Z_{22}/(Z_{14a}\ Z_{22})]$, where $V_{13c}$ is the output voltage of series amplifying network 13, $Z_{22}$ is the impedance of resistor 22 and $Z_{14a}$ is the impedance looking into winding 14*a*. Similarly, connected to the output of shunt amplifying network 15, is a second impedance control means which here takes the form of a voltage divider including winding 16*a* and resistor 28. Neglecting the effect of resistors 66 and 67, this voltage divider establishes, at junction $J_1$, a voltage that is equal to: $V_{15c} \times [Z_{16a}/(Z_{16a}+Z_{28})]$, where $V_{15c}$ is the output voltage of shunt amplifying network 15, $Z_{16a}$ is the impedance looking into winding 16a and $Z_{28}$ is the impedance of resistor 28. Since the impedance looking into windings 14a and 16a are, in turn, determined by the impedance of the transmission line, it will be seen that the amplitudes of the voltages at junctions $J_1$ and $J_2$ and, consequently, the amplitudes of the input voltages to the series and shunt amplifying networks vary in accordance with the impedance of the transmission line.

Assuming that the party at station 10 is transmitting and that the impedance looking to the right into terminals 12*a*$_1$ and 12*b*$_1$ matches the impedance looking to the left into these terminals, there exists a matched condition wherein a non-detrimental portion of the transmitted signal will be reflected from the amplifier back to station 10. If, under these conditions, the impedance looking to the right into terminals 12*a*$_2$ and 12*b*$_2$ should increase from its initial value, due, for example, to a change in the frequency of the transmitted signal, the impedance presented by winding 16*a* will increase. An increase in the latter impedance, by voltage divider action, increases the amplitude of the voltage at junction $J_1$ and thereby increases the output voltage of series amplifying network 13. This increases the voltage which series windings 14*b*, 14*c*, 14*d* and 14*e* insert in aiding relationship to the transmitted signal and thereby decreases the impedance of the amplifier. Thus, the increase in the impedance looking to the right into terminals 12*a*$_2$ and 12*b*$_2$ is compensated by a decrease in the impedance of the amplifier causing the net impedance looking to the right into terminals 12*a*$_1$ and 12*b*$_1$ to remain near the value at which it was matched to the impedance looking to the left into those terminals.

At the same time that the impedance presented by winding 16*a* increases, the impedance presented by winding 14*a* will also increase. The increased impedance of winding 14*a*, by voltage divider action, decreases the amplitude of the voltage at junction $J_2$ and thereby decreases the upward flowing current which shunt amplifying network 15 establishes in shunt winding 16*b*. This also decreases the impedance of the amplifier and helps to restore the impedance looking to the right into terminals 12*a*$_1$ and 12*b*$_1$ to the value at which it was matched to the impedance looking to the left into those terminals. Thus, signal amplifying activity shifts, in the manner of a teeter-totter, between the series and shunt amplifying networks in accordance with the changes in the impedance looking toward the receiving party to reduce the amount of mismatch which the circuit of the invention presents to the transmitting party. I have found that this shift does not substantially affect the overall gain provided by the circuit of FIG. 1.

It will be understood that the above described impedance adjusting activity is also effective to increase the impedance of the amplifier to compensate for decreases in the impedance looking to the right into terminals 12*a*$_2$ and 12*b*$_2$, this activity being the converse of that described above.

An actual transmission, the transmitted signal, such as the voice, includes a plurality of components of differing frequencies. The above circuitry operates on each of these frequency components so that the impedance of the amplifier produces its impedance compensating effect simultaneously over the band of frequencies which are transmitted. This allows the circuit of FIG. 1 to be utilized without line-build-out networks.

In order to prevent the circuit of the invention from amplifying signal frequencies below the voice frequency band, capacitors 31 and 33 are provided. These capacitors, by presenting a high impedance at low frequencies, substantially reduce the amplitude of the low frequency components of the input voltage to amplifying networks 13 and 15. Similarly, in order to prevent the circuit of the invention from amplifying signal frequencies above the voice frequency band, operational amplifiers 18 and 24 may be selected from those operational amplifiers having internal high frequency roll-off circuitry. Thus, the circuit of FIG. 1 does not amplify those signal components which are unnecessary for voice communication, and which, if amplified, may give rise to circuit instabilities.

THE DIRECTIONAL CONTROL CIRCUITRY

Assuming now that the party at station 10 has finished talking and that the party at station 11 is beginning to talk, the above described phase relationships between the input and output voltages of amplifiers 18 and 24 will not be suitable for providing amplification. This is because the voltage which the signal from station 11 induces across shunt winding 16b will have the same polarity as was established thereacross by the signal from station 10 while the voltage which the signal from station 11 induces across series windings 14*b*, 14*c*, 14*d* and 14*e* will be reversed in polarity from that which was established thereacross by the signal from station 10. As a result, when the signal transmitted from station 11 renders terminal 11a positive from terminal 11*b*, series amplifying network 13 will continue to render the non-dotted ends of series windings 14*b*, 14*c*, 14 *d* and 14*e* positive from the dotted ends thereof and shunt amplifying network 15 will cause a downward flowing signal current to flow through shunt winding 16*b*. Both of these conditions oppose signal transmission from station 11.

To end that the desired signal amplification may be provided despite changes in the direction of transmission through conductors 12*a* and 12*b*, there are provided detector means 40 and 41, selector means 42 and series and shunt switching means 43 and 44, respectively. Detector means 40 and 41 and selector means 42 determine the direction of transmission in conductors 12a and 12b and utilize this directional determination to control switching means 43 and 44. Switching means 43 and 44, in turn, change the phase relationships between the inputs and outputs of the series and shunt amplifying networks, as required, to establish an aiding relationship between the transmitted signal and the output voltages and currents of amplifying networks 13 and 15, for both directions of signal transmission.

In the present embodiment, detector means 40 includes an operational amplifier 45 having a non-inverting input 45*a*, an inverting input 45*b* and an output 45*c*. Detector means 40 also includes a feedback resistor 46, input resistors 47 and 48, coupling capacitors 49 and 50 and a balance resistor 51. Finally, detector means 40 includes a voltage doubler network 52 including diodes 52*a* and 52*b*, capacitors 52*c* and 52*d* and a resistor 52*e*. The latter network serves to provide, at detector output 40*c*, a negative d-c voltage having a magnitude which varies in accordance with twice the peak value of the a-c voltage appearing at amplifier output 45*c*.

Since detector inputs 40*a* and 40*b* are connected to inverting input 45*b* of amplifier 45 through resistors 47 and 48, respectively, amplifier 45 functions as an adder to produce an output voltage that varies negatively in accordance with the sum of the a-c voltages applied to detector inputs 40*a* and 40*b*. Thus, detector means 40 provides a negative d-c voltage having a magnitude which is proportional to the peak of the sum of the a-c voltages at detector inputs 40*a* and 40*b*.

Similarly, detector means 41 includes an operational amplifier 54 having a non-inverting input 54*a*, an inverting input 54*b*, and an output 54*c*. Detector means 41 also includes a feedback resistor 55, input resistors 56 and 57, the coupling capacitors 58 and 59 and a balance resistor 60. Finally, detector means 41 includes a voltage doubler network 62 including diodes 62*a* and 62*b*, capacitors 62*c* and 62*d* and a resistor 62*e*. The latter network provides, at detector output 41*c*, a positive d-c voltage having a magnitude which varies in accordance with twice the peak amplitude of the a-c voltage appearing at amplifier output 54*c*.

Since detector input 41*a* is connected to non-inverting amplifier input 54*a* through a resistor 56 and since detector input 41*b* is connected to inverting amplifier input 54*b* through a resistor 57, amplifier 54 functions as a subtractor to produce an output voltage that varies in accordance with the difference between the a-c voltages applied to detector inputs 41*a* and 41*b*. Thus, detector means 41 provides a positive d-c voltage having a magnitude which is proportional to the peak of the difference between the a-c voltages at detector inputs 41*a* and 41*b*.

The reason for providing voltage doubler networks 52 and 62 is, as will be described more fully presently, that selector 42 is responsive to the difference between the voltages appearing at detector outputs 40*c* and 41*c* and that doubler networks 52 and 62, by doubling the voltages which would otherwise be present at outputs 40*c* and 41*c*, double the difference voltage which is applied to selector 42. This stabilizes the operation of selector 42 under conditions where the voltage at detector output 40*c* is approximately equal to the voltage at detector output 41*c*.

In order to control the voltages at the inputs of detectors 40 and 41 in accordance with the dominant direction of transmission in conductors 12*a* and 12*b*, detector inputs 40*a* and 41*b* are connected to junction $J_2$ through conductors 64*a*, 64*b* and 64*c*, and detector inputs 40*b* and 41*b* are connected to junction $J_1$ through conductors 65*a*, 65*b* and 65*c* and a voltage divider including resistors 66 and 67. As a result, the voltages at detector inputs 40*a* and 41*a* vary in accordance with the signal current which is sensed through series windings 14*b*, 14*c*, 14*d* and 14*e* and the voltages at detector inputs 40*b* and 41*b* vary in accordance with the signal voltage which is sensed through shunt winding 16*b*.

When the party at station 10 begins transmitting, the voltages which he establishes across series windings 14*b*, 14*c*, 14*d* and 14*e* are in phase with the voltage across shunt winding 16*b*. That is, the voltages are such that the dotted end of shunt winding 16*b* has the same polarity with respect to the non-dotted end thereof as the dotted ends of windings 14*b*, 14*c*, 14*d* and 14*e* have with respect to the respective non-dotted ends thereof. As a result, the voltages at junctions $J_1$ and $J_2$ are in phase, causing additive operational amplifier 45 to produce a substantial a-c output voltage. This, in turn, causes the d-c voltage at detector output 40*c* to have a substantial negative value. Because, in addition, the in-phase voltages at junctions $J_1$ and $J_2$ are applied subtractively to operational amplifier 54, the a-c output voltage of amplifier 54 will have a negligible value, causing the detector output 41*c* to be near ground potential. Upon the occurrence of this condition, as will be seen presently, amplifying networks 13 and 15 assume their first directional amplifying states to amplify the transmission from station 10.

When the party at station 11 begins transmitting, however, the voltages which he establishes across series windings 14*b*, 14*c*, 14*d* and 14*e* are 180° out of phase with the voltage across shunt winding 16*b*. As a result, the voltage at junction $J_1$ is 180° out-of-phase with the voltage at junction $J_2$, causing subtractive amplifier 54 to produce a substantial a-c output voltage. This, in turn, causes the d-c voltage at detector output 41c to have a substantial positive value. Because, in addition, the out-of-phase voltages at junctions $J_1$ and $J_2$ are applied additively to operational amplifier 45, the a-c output voltage of amplifier 45 will have a negligible value, causing detector output 40*c* to be near ground potential. Upon the occurrence of this condition, as will also be seen presently, amplifying networks 13 and 15 assume their second directional amplifying states to amplify the transmission from station 11.

If the parties at stations 10 and 11 transmit simultaneously, a negative voltage substantially proportional to the amplitude of the signal from station 10 will appear at detector output 40*c* and a positive voltage substantially proportional to the amplitude of the signal from station 11 will simultaneously appear at detector output 41*c*. Thus, the magnitude of the negative voltage at detector output 40*c* in relation to the magnitude of positive voltage at detector output 41*c* is determined by the relative strengths of the signals transmitted from stations 10 and 11. This magnitude, in turn, identifies the dominant station (the larger magnitude) and the non-dominant station (the smaller magnitude). In view of the fact that direction detectors 40 and 41 are controlled by the voltages and currents which the transmitted signal establishes across and through the windings of series and shunt transformers 14 and 16, it will be seen that these transformers serve a voltage and current sensing function in addition to the input and output coupling functions described previously in connection with amplifying networks 13 and 15.

In accordance with the present invention, the appearance of a negative voltage at detector output 40*c* which is greater in magnitude than the positive voltage at detector output 41*c* is utilized, as will be explained in detail presently, to connect feedback conductor 30*a* to phase-maintaining amplifying network input 13*a* and to connect feedback conductor 32*a* to phase-maintaining amplifying network input 15*a*. This causes both the series and the shunt amplifying networks to produce voltages which increase the amplitude of signals transmitted from station 10 which is dominant, there being a greater magnitude of voltage at output 40*c*. This is the first directional amplifying or phase-maintaining state of the amplifier.

Similar, as will also be explained presently, the appearance of a positive voltage at detector output 41*c* which is greater in magnitude than the negative voltage at detector output 40*c* is utilized to connect feedback conductor 30*a* to the phase-reversing amplifying network input 13*b* and to connect feedback conductor 32*a* to phase-reversing amplifying network input 15*b*. This causes both the series and the shunt amplifying networks to produce voltages which increase the amplitude of the signals transmitted from transceiving station 11 which is now dominant, there being a greater magnitude of voltage at output 41*c*. This is the second directional amplifying or phase-reversing state of the amplifier. Thus, amplification is afforded to whichever station, 10 or 11, transmits the strongest signal.

Because amplifier circuits for transmission lines are not ordinarily switched on at the beginning of signal transmission and switched off at the end thereof, it is desirable that they have a low power dissipation when they are not being used due either to the fact that the telephone sets are both on-hook or that the parties are on the line but not speaking at a given time. In the circuit of the invention, the desired low power dissipation is afforded by circuitry which switches the amplifier into a quiescent, third or non-amplifying state when neither party is transmitting, that is, when ground potential appears at detector outputs 40*c* and 41*c* at the same time. Operation of the amplifier in this third state is initiated either by momentary silence of both parties during a conversation or by both parties hanging up at the end of a conversation. As will be discussed later in connection with switching means 43 and 44, this is accomplished by connecting feedback conductor 30*a* to both inputs of series amplifying network 13 and by connecting feedback conductor 32*a* to both inputs of shunt amplifying network 15, resulting in signal cancellation within both amplifying networks.

To the end that the circuit of FIG. 1 may switch between its two amplifying states rapidly enough to prevent the loss or clipping of the initial portion of transmission from either station and may switch between either the first or second directional amplifying states and the third or quiescent state slowly enough to prevent loss of amplification between syllables, voltage doubler networks 52 and 62 are provided with resistors 52*e* and 62*e*, respectively.

When only one party is speaking at any given time, resistors 52*e* and 62*e* operate in conjunction with capacitors 52*d* and 62*d*, respectively, to delay, by a predetermined minimum time, the switching of the amplifier into its third or non-amplifying state, after that one party stops talking. This is because the capacitor which is charged by transmission from the station of the talking party is highly charged while the capacitor which is charged by transmission from the station of the silent party is substantially uncharged. Consequently, the amount of time required for the magnitudes of the voltages at detector outputs 40*c* and 41*c* to become equal to ground potential, is equal to the time required for the charged capacitor to discharge to ground potential through the resistor connected thereacross. As a result, the amplifier is prevented from switching into its third or quiescent state during the short pauses between words or syllables.

When, however, both parties are speaking at the same time, resistors 52*e* and 62*e* do not substantially affect the amount of time required for the magnitude of voltage at detector output 40*c* to become larger than the magnitude of the voltage at detector output 41*c* or vice-versa. This is because capacitors 52*d* and 62*d* are both partially charged (due to the fact that both parties are talking) and because the capacitor initially having less charge need only charge for a time sufficient to render that capacitor more highly charged than the other. This is also because, as will be described presently, positive feedback is provided to cause the amplifier of FIG. 1 to switch between its first and second amplifying states in a regenerative manner. Consequently, the time required for the relative magnitudes of the voltages at 40*c* and 41*c* to reverse is short and is not related to the amount of time required for each capacitor to discharge to ground potential through the respective resistor. Thus, the time required for the circuit of the invention to switch between its first and second amplifying states is independent of the time required for the circuit of the invention to switch into its third state.

The circuitry which causes the circuit of FIG. 1 to switch between its first and second directional amplifying states in a regenerative manner will now be described. Assuming that the party at station 11 is transmitting a higher amplitude signal than the party at station 10 and that terminal 11*a* is positive from terminal 11*b*, amplifier 13 will render the dotted end of winding 14*a* positive from the non-dotted end thereof and amplifier 15 will render the dotted end of winding 16*a* positive from the non-dotted end thereof. This causes junction $J_2$ to become negative from ground and causes junction $J_1$ to become positive from ground, thus resulting in the establishment of the second amplifying state.

If, under these conditions, the signal from station 10 attains an amplitude that is sufficient to produce, in transformer winding 14a, a current which renders junction $J_2$ positive from ground, the phase relationship between the voltages at junctions $J_1$ and $J_2$ will change from 180° out of phase to an in phase condition. This change in phase relationship will, in turn, cause the states of the voltages at detector outputs 40c and 41c to reverse. Upon reversal in the states of the voltages at detector outputs 40c and 41c, the feedback signal through conductor 30a will be shifted away from amplifier input 13b and to amplifier input 13a. As a result, amplifier 18 will produce an output voltage which renders junction $J_2$ positive from ground. Thus, as a result of station 10 rendering junction $J_2$ positive from ground, a transition occurs which renders junction $J_2$ even more positive from ground, thus resulting in the rapid establishment of the first amplifying state. Thus, once a non-dominant party's voice becomes sufficiently louder than that of the other party, a positive feedback relationship arises which establishes him as the dominant party.

In order that the relative magnitudes of the voltages at detector outputs 40c and 41c may be utilized to control the connections between feedback conductors 30a and 32a and amplifying networks 13 and 15, respectively, there is provided selector means 42. In the present embodiment, selector means 42 includes an operational amplifier 70 having a non-inverting input 70a, an inverting input 70b and an output 70c. Selector means 42 also includes a feedback resistor 71, input resistors 72 and 73 and a balancing resistor 74. Finally, selector means 42 includes diodes 76 and 77, resistors 78 and 79 filter capacitors 80 and 81.

Because selector inputs 42a and 42b are both connected to inverting input 70b of amplifier 70, output 70c thereof varies negatively in accordance with the sum of the voltages applied to selector inputs 42a and 42b. Accordingly, when detector output 41c applies a positive voltage to selector input 42b which is greater than the negative voltage that detector output 40c applies to selector input 42a, that is, when the party at station 11 is dominant, amplifier 70 has a net positive input voltage causing it to produce a negative output voltage. Conversely, when detector output 40c applies a negative voltage to selector input 42a which is greater than the positive voltage that detector output 41c applies to selector input 42b, that is, when the party at station 10 is dominant, amplifier input 70b has a net negative input voltage causing it to produce a positive output voltage. In addition, when detector outputs 40c and 41c apply ground potential to selector inputs 42a and 42b, respectively, that is, when neither party is transmitting, amplifier output 70c attains ground potential. Thus, amplifier 70 serves as a comparator or discriminator in that the magnitude and polarity of its output voltage is determined by the magnitude and direction of transmission in conductors 12a and 12b.

When the party at station 10 is the dominant transmitter, amplifier output 70c will be positive from ground, as previously described. Under these conditions, current flows from amplifier output 70c through diode 77 and the parallel circuit including resistor 79 and capacitor 81 to ground. This causes a positive voltage to appear at selector output 42x. At the same time, diode 76 is reverse biased causing ground potential to appear at selector output 42y. Under these conditions, as will be seen presently, switching means 43 and 44 connect feedback conductors 30a and 32a to amplifier inputs 13a and 15a, respectively, to establish he first directional amplifying state and thereby amplify the transmission from station 10.

When, however, the party at station 11 is the dominant transmitter, amplifier output 70c will be negative from ground. Under these conditions, current flows from ground through the parallel circuit including resistor 78 and capacitor 80, and diode 76 to amplifier output 70c. This causes a negative voltage to appear at selector output 42y. At the same time, diode 77 is reverse biased, causing ground potential to appear at selector output 42x. Under these conditions, as will be explained presently, switching means 43 and 44 connect feedback conductors 30a and 32a to amplifier inputs 13b and 15b, respectively, to establish the second directional amplifying state and thereby amplify the transmission from station 11.

When neither party is transmitting, amplifier output 70c will be at ground potential. As a result, neither diode 76 nor diode 77 can conduct and ground potential appears at selector outputs 42x and 42y. Under these conditions, as will be explained presently, switching means 43 connects feedback conductor 30a to amplifier inputs 13a and 13b and switching means 44 connects feedback conductor 32a to amplifier inputs 15a and 15b. This establishes the third or non-amplifying state of the circuit of the invention.

Although the circuit of FIG. 1 changes directional amplifying states, as required, to follow changes in the dominant direction of transmission, a conversation conducted therethrough is free from the switched quality which has characterized voice-switched amplifiers. This is because normal human conversation is made up of a series of sounds which vary widely in amplitude due to the accentuation of certain words and syllables and because the circuit of the invention changes states rapidly, on a syllabic basis, to establish an amplifying characteristic which reflects the syllabic nature of human speech.

The circuitry of the present invention is able to perform its amplifying function and impart its advantages to a telephone communication system during the normal course of conversation between human beings. Normally, in such a conversation it is indeterminate which party will be talking the loudest and thus transmit the signal of greater amplitude at any given point in the conversation. This dominance of one party or the other can be of long duration or it can be of short duration and dominance may be transferred from one party to the other in quite rapid succession as in argumentative or overlapping conversation. It is evident from the description herein that there is provided a highly versatile circuit which can perform satisfactorily in the face of these indeterminate and random changes of conditions that occur in a normal conversation to bring about, under these normal conditions of conversation, the desired amplifying activity without the telephone subscribers being aware of the directional switching activity of the circuitry of the invention to accomplish the advantages thereof.

From the foregoing, it will be seen that in contrast with conventional voice-switched amplifiers wherein the directions of amplification reverse only after the party receiving amplification stops talking, the direction of amplification of the circuit of the invention reverses when, and as often as, there occur syllabic reversals in the dominant direction of transmission through the transmission line, to provide amplification which reflects the syllabic nature of normal human speech. Thus, the circuit of the invention is a syllabic switching amplifier.

Additionally, the circuit of the invention is such that, for instance, during simultaneous transmission of signals from both stations 10 and 11, it discriminates between the then dominant and non-dominant signals while affording this transmission in both directions. Thus, the circuit instantaneously selects the dominant direction of transmission while affording simultaneous transmission in both directions.

To the end that the positive and negative voltages appearing at selector outputs 42*x* and 42*y* may control the electrical path between junctions $J_1$ and $J_2$ and the inputs of amplifying networks 13 and 15, respectively, there is provided switching means which here takes the form of series and shunt switching networks 43 and 44, respectively. In the present embodiment, series switching network 43 includes a pair of complementary junction field effect transistors 83 and 85, and a pair of resistors 85 and 86. Similarly, shunt switching network 44 includes a pair of complementary junction field effect transistors 87 and 88 and a pair of resistors 89 and 90. Each of the above field effect transistors has a gate *g*, a source *s* and a drain *d*.

When the transmission line is in a quiescent condition, that is, when neither station is transmitting, as when both parties have hung up or both parties are on the line and not speaking, amplifier output 70*c* is at ground potential. As a result, selector outputs 42*x* and 42*y* apply ground potential to control inputs 43*x* and 43*y* and 44*x* and 44*y* of switching means 43 and 44, respectively. Since the potential at the latter inputs appear at the gates of transistors 84, 83, 88 and 87, respectively, and since the sources of these transistors are connected to ground through the operational amplifiers of the respective amplifying networks, transistors 83, 84, 87 and 88 conduct simultaneously through their drain-source circuits. This simultaneous conduction causes substantially equal feedback signals to appear at series amplifying network inputs 13*a* and 13*b* and at shunt amplifying network inputs 15*a* and 15*b*. As a result, substantially no amplified voltage appears across series transformer windings 14*b*, 14*c*, 14*d* and 14*e* and no amplified current flows in shunt winding 16*b*. Thus, when neither party is transmitting, switching networks 43 and 44 cause the circuit of the invention to assume its third or quiescent state.

When the party at station 10 is transmitting the dominant signal, selector output 42*x* is positive from ground and selector output 42*y* is at ground potential, as previously described. Under these conditions, N-channel field effect transistors 83 and 87 conduct but P-channel field effect transistors 84 and 88 do not. As a result, feedback conductors 30*a* and 32*a* are connected to amplifying network inputs 13*a* and 15*a*, and signals originating at station 10 are amplified. Conversely, when the party at station 11 is transmitting the dominant signal, selector output 42*y* is negative from ground and selector output 42*x* is at ground potential, as previously described. Under these conditions, P-channel field effect transistors 84 and 88 conduct but N-channel field effect transistors 83 and 87 do not. As a result, feedback conductors 30*a* and 32*a* are connected to amplifying network inputs 13*b* and 15*b* and signals originating at station 11 are amplified. Thus, switching networks 43 and 44 control the activity of amplifying networks 13 and 15 in accordance with the magnitude and direction of transmission through conductors 12*a* and 12*b*, as manifested by the magnitudes and polarities of the voltages at selector outputs 42*x* and 42*y*.

While the circuit of the invention provides only unidirectional amplification, it does not prevent the reception of signals from the non-dominant transmitter. This is because conductors 12*a* and 12*b* and the series transformer windings provide a continuous metallic path from the transmitter of the non-dominant party to the receiver of the dominant party. One result is that the dominant party can sense the presence of the non-dominant party. Another result is that the non-dominant party can interrupt the amplified transmission of the dominant party. Thus, the circuit of the invention allows communication which has the quality of normal conversation.

In view of the foregoing, it will be seen that the circuit of FIG. 1 comprises a first amplifier having an input signal proportional to the signal voltage across the transmission line and having an output coupled in series with the transmission line; a second amplifier having an input signal proportional to the signal current through the transmission line and having an output coupled across the transmission line; and directional control circuitry for connecting these amplifiers in signal amplifying relationship to the station which transmits the highest amplitude signal.

THE CIRCUIT OF FIGURE 2

Figure 2:
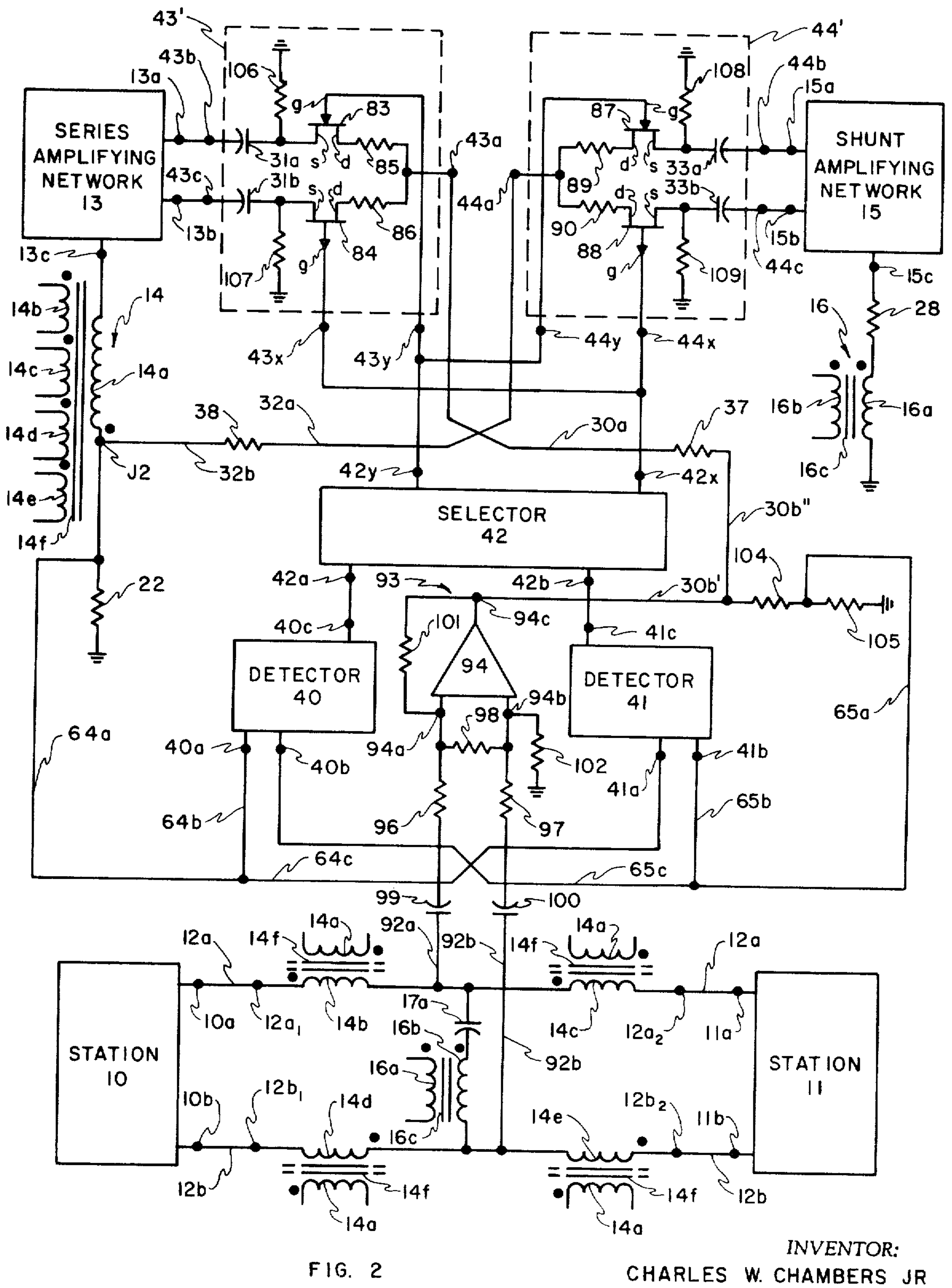
FIG. 2 is a schematic diagram of a modified circuit embodying the invention.

In the circuit of FIG. 2, the input voltage for series amplifying network 13 is derived from a voltage sensed directly across the transmission line, through conductors 92*a* and 92*b*, rather than from a voltage sensed indirectly, through shunt transformer 16 and a capacitor 17, as in FIG. 1.

As described previously in connection with FIG. 1, it is desirable that d-c blocking capacitor 17 have a capacitive reactance which is sufficiently small to allow substantially unimpeded sensing of the signal voltage across the transmission line but which is sufficiently large to prevent cross-ringing. Other problems which may arise as a result of using a d-c blocking capacitor having insufficient capacitive reactance are dialing pulse distortion and the premature energization of the trip relay thereby preventing the ringing of bells at the telephone set. In order to eliminate these problems, there is provided the circuit of FIG. 2 which is similar to that of FIG. 1, like parts being similarly numbered.

In the circuit of FIG. 2, capacitor 17 of FIG. 1 is replaced by a capacitor 17*a* which has a capacitive reactance sufficiently large to prevent cross-ringing, dial pulse distortion and premature operation of trip relay. The more direct voltage sensing through conductors 92*a* and 92*b* allows the signal voltage across the line to be accurately sensed in spite of the fact that the capacitive reactance of capacitor 17*a* of FIG. 2 is substantially greater than that of capacitor 17 of FIG. 1.

To the end that the input voltage of series amplifying network 15 of FIG. 2 may be controlled directly in accordance with the signal voltage across the transmission line, there is provided input coupling means 93 which here includes an operational amplifier 94 having input terminals 94*a* and 94*b* and an output terminal 94*c*. Input coupling means 93 also includes input resistors 96, 97 and 98, input coupling capacitors 99 and 100, a feedback resistor 101 and a balance resistor 102. Amplifier output 94*c* is connected in voltage control relationship to the inputs of series amplifying network 13 through feedback conductors 30*b*′ and 30*b*″, a resistor 37, feedback conductor 30*a* and series switching means 43′.

Resistors 37 and 38 control the gain of amplifying networks 13 and 15, respectively, and may be variable to provide gain adjustment.

Since the input signal to series amplifying network 13 of FIG. 2 is provided by input coupling network 93 rather than by shunt transformer 16, as in FIG. 1, transformer 16 of FIG. 2 serves only to couple the output of shunt amplifying network 15 to the transmission line. Thus, in contrast with the circuit of FIG. 1, wherein the input coupling means for series amplifying network 13 and the output coupling means for shunt amplifying network 15 are combined in transformer 16, the circuit of FIG. 2 utilizes an input coupling means 93 for series amplifying network 13 which is separate from output coupling means 16 for shunt amplifying network 15.

In spite of the fact that feedback conductor 30a of FIG. 2 is not connected to the voltage divider formed by resistor 28 and winding 16*a* of shunt amplifying network 15, as in FIG. 1, the circuit of FIG. 2 exhibits substantially the same impedance regulating characteristic described previously in connection with FIG. 1. This is because the amplitude of the voltage which amplifier 94 applies to the input of series amplifying network 13 varies substantially in accordance with the impedance of the transmission line.

Similarly, in spite of the fact that detector sensing lead 65*a* of FIG. 2 is not connected to winding 16a, as in FIG. 1, the circuit of FIG. 2 accomplishes the same direction detecting activity described in connection with FIG. 1. This is because detector sensing lead 65*a* is connected to the output of amplifier 94 through a voltage divider including resistors 104 and 105 and because amplifier 94 serves to provide the same directional information provided by transformer 16 of FIG. 1.

Another difference between the circuit of FIG. 2 and the circuit of FIG. 1 is that coupling capacitors 31 and 33 of FIG. 1 have been replaced by capacitors 31*a*, 31*b*, 33*a* and 33*b* of FIG. 2 to improve the phase angle characteristics of the feedback signal. In addition, resistors 106, 107, 108 and 109 have been added to switching means 43 and 44 to minimize the differences between the amplitudes of the input signals at the different inputs of each amplifying network which result from differences between the impedances presented by conducting N-channel field effect transistors 83 and 87 and the impedances presented by conducting P-channel field effect transistors 84 and 88.

In view of the foregoing, it will be seen that an amplifier circuit constructed in accordance with the present invention is adapted to provide highly stable and substantially echo free amplification of signals transmitted by parties at either end of a transmission line; and includes circuitry which allows communication in the nature of face-to-face conversation and yet which provides a desirable level of return loss.

What is claimed is:

1. In a circuit for increasing the amplitude of signals transmitted through a multi-wire transmission line, in combination, series amplifying means having input means and output means, said series amplifying means having a first directional amplifying state wherein the amplitude of signals received at a first end of the transmission line are increased and a second operative state wherein the amplitude of signals received at a second end of the transmission line are increased, shunt amplifying means having input means and output means, said shunt amplifying means having a first directional amplifying state wherein the amplitude of signals received at said first end of the transmission line are increased and a second directional amplifying state wherein the amplitude of signals received at said second end of the transmission line are increased, means for coupling the output means of said series amplifying means in series with the transmission line, means for coupling the output means of said shunt amplifying means across the transmission line, means for applying an input signal proportional to the signal voltage across the transmission line to the input means of said series amplifying means, means for applying an input signal proportional to the signal current through the transmission line to the input means of said shunt amplifying means and means for controlling the directional amplifying states of said amplifying means in accordance with the direction of transmission through the transmission line.

2. A circuit as set forth in claim 1 including impedance control means for controlling the amplitudes of the input signals at the input means of said series and shunt amplifying means in accordance with the impedance of the transmission line and means for connecting said impedance control means to the input means of said series and shunt amplifying means.

3. A circuit as set forth in claim 1 including first impedance control means for respectively decreasing and increasing the amplitude of the input signal appearing at the input means of said shunt amplifying means in accordance with increases and decreases in the impedance of the transmission line, second impedance control means for respectively increasing and decreasing the amplitude of the input signal appearing at the input means of said series amplifying means in accordance with increases and decreases in the impedance of the transmission line, means for connecting said first impedance control means in impedance sensing relationship to the transmission line, means for connecting said first impedance control means to the input means of said shunt amplifying means, means for connecting said second impedance control means in impedance sensing relationship to the transmission line and means for connecting said second impedance control means to the input means of said series amplifying means.

4. In a circuit for increasing the amplitude of signals transmitted through a multi-wire transmission line, in combination, series amplifying means and shunt amplifying means each having phase-maintaining input means, phase-reversing input means and output means, series input coupling means and shunt input coupling means for said series and shunt amplifying means respectively, said respective input coupling means being adapted to energize the input means of the respective series and shunt amplifying means in accordance with the voltage across and current in said transmission line respectively, means for connecting said series and shunt input coupling means to the transmission line, series output coupling means for applying to the transmission line a voltage established by said series amplifying means, means for connecting said series output coupling means to the output means of said series amplifying means and in series with the transmission line, shunt output coupling means for applying to the transmission line a current established by said shunt amplifying means, means for connecting said shunt output coupling means to the output means of said shunt amplifying means and across the transmission line, series switching means and shunt switching means for connecting said series and shunt input coupling means respectively to the phase-maintaining input means of said series and shunt amplifying means respectively when the dominant direction of transmission through the transmission line is in a first direction and for connecting said series and shunt input coupling means respectively to the phase-reversing input means of said series and shunt amplifying means respectively when the dominant direction of transmission through the transmission line is in a second direction, control means for controlling said series and shunt switching means in accordance with the dominant direction of transmission through the transmission line and means for connecting said control means to said switching means.

5. In a circuit for increasing the amplitude of signals transmitted through a multi-wire transmission line, in combination, series amplifying means and shunt amplifying means each having input means and output means, each of said amplifying means having a phase-maintaining operative state and a phase-reversing operative state, series input coupling means for energizing the input means of said series amplifying means in accordance with the voltage across the transmission line, shunt input coupling means for energizing the input means of said shunt amplifying means in accordance with the current in the transmission line, means for connecting said series and shunt input coupling means to the input means of respective amplifying means and to the transmission line, series output coupling means for applying to the transmission line a voltage that varies in accordance with the voltage at the output means of said series amplifying means, shunt output coupling means for applying to the transmission line a current that varies in accordance with the current at the output means of said shunt amplifying means, means for connecting said series and shunt output coupling means to the output means of respective amplifying means and to the transmission line, control means for establishing the phase-maintaining operative state of said amplifying means when the dominant direction of transmission through the transmission line is in a first direction and for establishing the phase-reversing operative state of said amplifying means when the dominant direction of transmission through the transmission line is in a second direction and means for connecting said control means to the transmission line and to said amplifying means.

6. A circuit as set forth in claim 5 including impedance control means for controlling the amplitudes of the input signals at the input means of said amplifying means in accordance with the impedance of the transmission line and means for connecting said impedance control means to the input means of said amplifying means.

7. A circuit as set forth in claim 5 including first impedance control means for respectively decreasing and increasing the amplitude of the input signal at the input means of said shunt amplifying means in accordance with increases and decreases in the impedance of the transmission line, second impedance control means for respectively increasing and decreasing the amplitude of the input signal at the input means of said series amplifying means in accordance with increases and decreases in the impedance of the transmission line, means for connecting said first impedance control means in impedance sensing relationship to the transmission line, means for connecting said first impedance control means to the input means of said shunt amplifying means, means for connecting said second impedance control means in impedance sensing relationship to the transmission line and means for connecting said second impedance control means to the input means of said series amplifying means.

8. In a circuit for increasing the amplitude of signals transmitted through a multi-wire transmission line, in combination, series amplifying means and shunt amplifying means each having input means and output means, each of said amplifying means having a phase-maintaining operative state and a phase-reversing operative state, series coupling means, means for connecting said series coupling means to the output means of said series amplifying means and in series with the transmission line, shunt coupling means, means for connecting said shunt coupling means to the output means of said shunt amplifying means and across the transmission line, means for connecting said series coupling means in energizing relationship to the input means of said shunt amplifying means means for connecting said shunt coupling means in energizing relationship to the input means of said series amplifying means, sensing-control means for determining the dominant direction of transmission in the transmission line, and means for connecting said sensing-control means in operative, state-controlling relationship to said amplifying means.

9. A circuit as set forth in claim 8 including impedance control means for controlling the amplitudes of the signals appearing at the output means of said amplifying means in accordance with the impedance of the transmission line and means for connecting said impedance control means to said series and shunt amplifying means.

10. A circuit as set forth in claim 8 in which said control means includes means for establishing the phase-maintaining operative states of said amplifying means when the voltages which a transmitted signal produces across said series and shunt coupling means are substantially in phase and for establishing the phase-reversing operative states of said amplifying means when the voltages which a transmitted signal produces across said series and shunt coupling means are substantially 180° out of phase.

11. A circuit as set forth in claim 8 including first impedance control means for respectively decreasing and increasing the amplitude of the input signal appearing at the input means of said shunt amplifying means in accordance with increases and decreases in the impedance of the transmission line, second impedance control means for respectively increasing and decreasing the amplitude of the input signal appearing at the input means of said series amplifying means in accordance with increases and decreases in the impedance of the transmission line, means for connecting said first impedance control means in impedance sensing relationship to the transmission line, means for connecting said first impedance control means to the input means of said shunt amplifying means, means for connecting said second impedance control means in impedance sensing relationship to the transmission line and means for connecting said second impedance control means to the input means of said series amplifying means.

12. In a circuit for increasing the amplitude of signals transmitted through a multi-wire transmission line, in combination, series amplifying means and shunt amplifying means each having input means and output means, each of said amplifying means having a phase-maintaining operative state and a phase-reversing operative state, series coupling means, means for connecting said series coupling means in series with the transmission line, shunt coupling means, means for connecting said shunt coupling means across the transmission line, switching means for establishing the phase-maintaining operative states of said amplifying means when said switching means is in a first operative state and for establishing the phase-reversing operative states of said amplifying means when said switching means is in a second operative state, means for connecting said series and shunt coupling means to the input means of said shunt and series amplifying means respectively, means for connecting the output means of said series and shunt amplifying means to the transmission line through said series and shunt coupling means respectively, control means for establishing the first operative state of said switching means when the dominant direction of transmission through the transmission line is in a first direction and for establishing the second operative state of said switching means when the dominant direction of transmission through the transmission line is in a second direction, means for connecting said control means to said series and shunt coupling means and means for connecting said control means in operative, state-controlling relationship to said switching means.

13. In a circuit for increasing the amplitude of signals transmitted through a multi-wire transmission line, in combination, series amplifying means and shunt amplifying means each having input means and output means, said series and shunt amplifying means each having a first operative state wherein the signal at the output means thereof is in phase with the signal at the input means thereof and each having a second operative state wherein the signal at the output means thereof is out of phase with the signal at the input means thereof, series coupling means having a plurality of windings, means for connecting at least one of the windings of said series coupling means in series with the transmission line, means for connecting another of the windings of said series coupling means to the output means of said series amplifying means, shunt coupling means having a plurality of windings, means for connecting one of the windings of said shunt coupling means across transmission line, means for connecting another of the windings of said shunt coupling means to the output means of said shunt amplifying means, means for connecting said series and shunt coupling means in energizing relationship to the input means of said shunt and series amplifying means respectively, control means for establishing the first operative state of said amplifying means when the voltages across predetermined windings of said series and shunt coupling means are in phase and for establishing the second operative state of said amplifying means when the voltages across said predetermined windings are out of phase and means for connecting said control means to said series and shunt coupling means and to said amplifying means.

14. In a circuit for increasing the amplitude of signals transmitted through a multi-wire transmission line, in combination, series amplifying means and shunt amplifying means, each having input means and output means, said series and shunt amplifying means each having a first operative state wherein the signal at the output means thereof is in phase with the signal at the input means thereof and each having a second operative state wherein the signal at the output means thereof is out of phase with the signal at the input means thereof, series coupling means and shunt coupling means each having a plurality of windings, means for connecting at least one of the windings of said series coupling means in series with the transmission line, first resistance means, a first voltage divider including said first resistance means and another winding of said series coupling means, means for connecting said first voltage divider to the output means of said series amplifying means, means for connecting one of the windings of said shunt coupling means across transmission line, second resistance means, a second voltage divider including said second resistance means and another winding of said shunt coupling means, means for connecting said second voltage divider to the output means of said shunt amplifying means, means for connecting said first and second voltage dividers in energizing relationship to the input means of said shunt and series amplifying means respectively, control means for establishing the first operative state of said amplifying means when the voltages across predetermined windings of said series and shunt coupling means are in phase and for establishing the second operative state of said amplifying means when the voltages across said predetermined windings are out of phase and means for connecting said control means to said series and shunt coupling means and to said amplifying means.

15. In a circuit for increasing the amplitude of signals transmitted through a multi-wire transmission line, in combination, series amplifying means for producing a signal voltage in aiding relationship to the transmitted signal, shunt amplifying means for producing a signal current in aiding relationship to the transmitted signal, said series and shunt amplifying means each including phase-reversing input means, phase-maintaining input means and output means, a series transformer, a shunt transformer, means for connecting at least one winding of said series transformer in series with the transmission line, means for connecting another winding of said series transformer to the output means of said series amplifying means, means for connecting one winding of said shunt transformer across the transmission line, means for connecting another winding of said shunt transformer to the output means of said shunt amplifying means, switching means for connecting said series and shunt transformers respectively to the phase-maintaining input means of said shunt and series amplifying means when said switching means is in a first operative state, for connecting said series and shunt transformers respectively to the phase-reversing input means of said shunt and series amplifying means when said switching means is in a second operative state and for connecting said series and shunt transformers respectively to both input means of said shunt and series amplifying means when said switching means is in a third operative state, detector means for determining the dominant direction of transmission in the transmission line, control means for controlling the operative states of said switching means in accordance with the directional determination of said detector means, means for connecting said control means to said switching means and to said detector means and means for connecting said detector means to said series and shunt transformers.

16. A circuit as set forth in claim 15 in which said detector means includes means for adding a voltage established by said series transformer to a voltage established by said shunt transformer, means for connecting said adding means to said series and shunt transformers, means for subtracting a voltage established by one of said transformer from a voltage established by the other of said transformers and means for connecting said subtracting means to said series and shunt transformers.

17. A circuit as set forth in claim 15 including timing means for delaying the switching of said switching means into said third operative state and means for connecting said timing means to said detector means.

18. In a circuit for increasing the amplitude of signals transmitted through a multi-wire transmission line, in combination, series amplifying means and shunt amplifying means each having input means and output means, said series and shunt amplifying means each having a first operative state wherein the signal appearing at the output means thereof is in phase with the signal appearing at the input means thereof, a second operative state wherein the signal appearing at the output means thereof is out of phase with the signal appearing at the input means thereof and a third operative state wherein substantially no signal appears at the output means thereof, series coupling means, shunt coupling means, means for connecting said series coupling means in series with the transmission line, means for connecting said shunt coupling means across the transmission line, means for connecting the output means of said series and shunt amplifying means in energizing relationship to said series and shunt coupling means respectively, means for connecting said series and shunt coupling means in energizing relationship to the input means of said shunt and series amplifying means respectively, control means for establishing the first operative state of said amplifying means when the dominant direction of transmission through the transmission line is in a first direction, for establishing the second operative state of said amplifying means when the dominant direction of transmission through the transmission line is in a second direction and for establishing the third operative state of said amplifying means when the transmission in both directions is negligible, means for connecting said control means in state-controlling relationship to said amplifying means and means for connecting said control means in sensing relationship to said coupling means.

19. A circuit as set forth in claim 18 in which said control means includes means for establishing said first operative state when the voltage which a transmitted signal produces across said series and shunt coupling means are substantially in phase and for establishing said second operative state when the voltages which a transmitted signal produces across said series and shunt coupling means are substantially out of phase.

20. A circuit as set forth in claim 18 including timing means for delaying the establishment of said third operative state and means for connecting said timing means to said control means.

21. In a circuit for increasing the amplitude of signals transmitted through a two-wire transmission line, in combination, series amplifying means for generating a signal voltage in aiding relationship to the transmitted signal, shunt amplifying means for generating a signal current in aiding relationship to the transmitted signal, said series and shunt amplifying means each including input means and output means, series input coupling means for coupling the input means of said series amplifying means to the transmission line, shunt input coupling means for coupling the input means of said shunt amplifying means to the transmission line, means for connecting said series input coupling means across the transmission line and to the input means of said series amplifying means, means for connecting said shunt input coupling means in series with the transmission line and to the input means of said shunt amplifying means, series output coupling means for coupling the output means of said series amplifying means to the transmission line, shunt output coupling means for coupling the output means of said shunt amplifying means to the transmission line, means for connecting said series output coupling means in series with the transmission line and to the output means of said series amplifying means, means for connecting said shunt coupling means across the transmission line and to the output means of said shunt amplifying means.

22. A circuit as set forth in claim 21 including impedance control means for controlling the amplitudes of the signals produced by said series and shunt amplifying means in accordance with the impedance of the transmission line and means for connecting said impedance control means to said series and shunt amplifying means and to said transmission line.

23. In a circuit for increasing the amplitude of signals transmitted through a multi-wire transmission line, in combination, series amplifying means for generating a signal voltage in aiding relationship to the transmitted signal, shunt amplifying means for generating a signal current in aiding relationship to the transmitted signal, said series and shunt amplifying means each including input means and output means, a series transformer including a plurality of coupled windings, a shunt transformer including a plurality of coupled windings, means for connecting at least one of the windings of said series transformer in series with the transmission line, means for connecting at least one winding of said shunt transformer across the transmission line, first and second resistance means, means for connecting another winding of said series transformer in series with said first resistance means to the output means of said series amplifying means, means for connecting said second resistance means in series with another winding of said shunt transformer to the output means of said shunt amplifying means, means for connecting the junction of said first resistance means and said another winding of said series transformer to the input means of said shunt amplifying means and means for connecting the junction of said second resistance means and said another winding of said shunt transformer to the input means of said series amplifying means.

24. In a circuit for increasing the amplitude of signals transmitted through a multi-wire transmission line, in combination, series amplifying means having input means and output means, said series amplifying means comprising means for producing an output voltage that is in phase with the input voltage thereof when said series amplifying means is in a first directional state and for producing an output voltage that is out of phase with the input voltage thereof when said series amplifying means is in a second directional state, shunt amplifying means having input means and output means, said shunt amplifying means comprising means for producing an output current that is in phase with the input voltage thereof when said shunt amplifying means is in a first directional state and for producing an output current that is out of phase with the input voltage thereof when said shunt amplifying means is in a second directional state, series input coupling means and shunt input coupling means, means for connecting said series input coupling means across the transmission line and to the input means of said series amplifying means, means for connecting said shunt input coupling means in series with the transmission line and to the input means of said shunt amplifying means, series output coupling means and shunt output coupling means, means for connecting said series output coupling means in series with the transmission line and to the output means of said series amplifying means, means for connecting said shunt output coupling means across the transmission line and to the output means of said shunt amplifying means, switching means for controlling the directional state of said series and shunt amplifying means, and means for connecting said switching means to said series and shunt amplifying means.

* * * * *